UNITED STATES PATENT OFFICE.

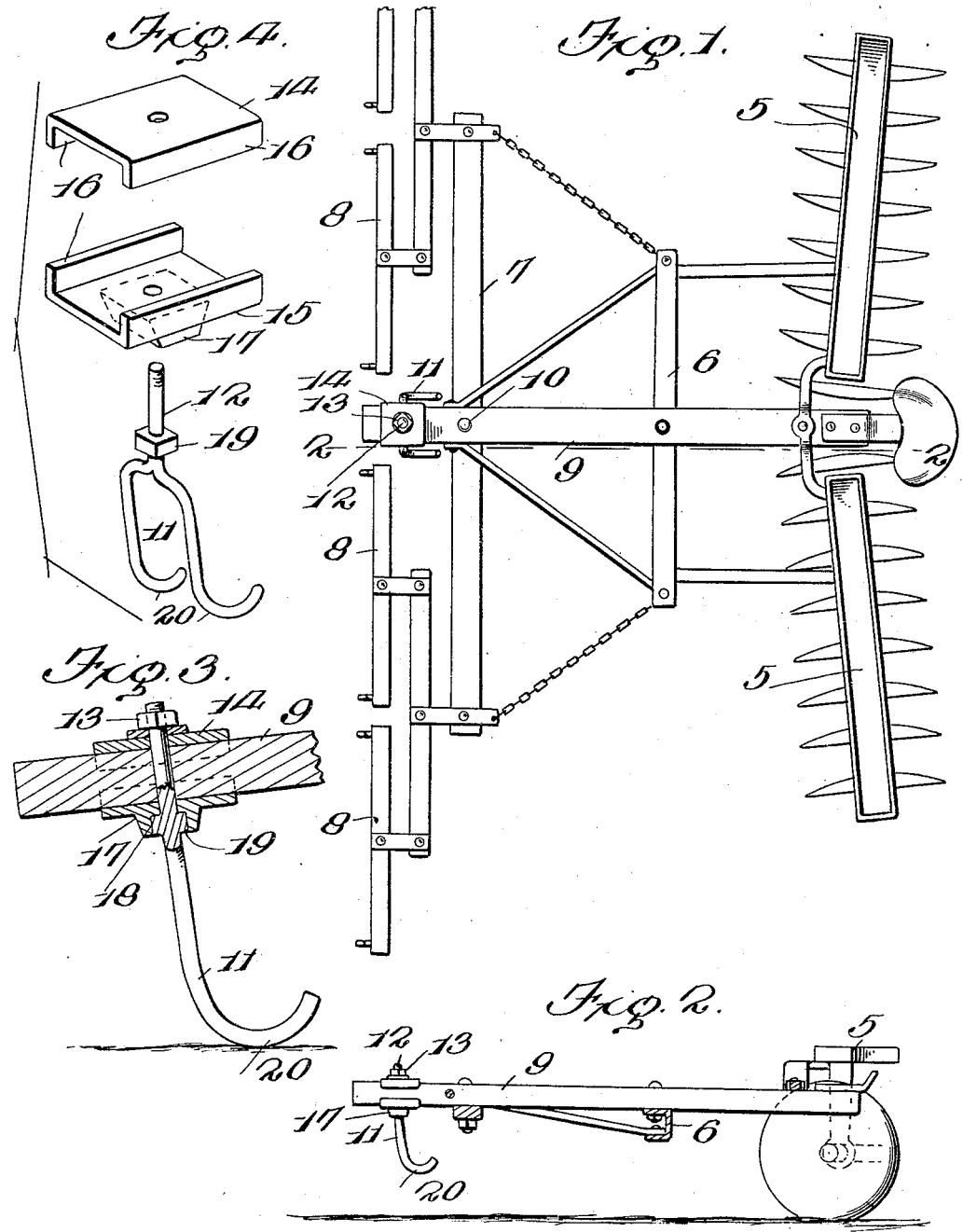

JACOB CLYDE ROATH, OF ADRIAN, ILLINOIS.

DISK TONGUE DEVICE.

940,194.     Specification of Letters Patent.     Patented Nov. 16, 1909.

Application filed April 20, 1909. Serial No. 491,164.

*To all whom it may concern:*

Be it known that I, JACOB CLYDE ROATH, a citizen of the United States, residing at Adrian, in the county of Hancock and State of Illinois, have invented certain new and useful Improvements in Disk Tongue Devices, of which the following is a specification.

This invention contemplates the provision of a novel form of rest or support especially designed for attachment to a disk harrow or other agricultural machine and by means of which the usual draft tongue may be dispensed with, thereby to prevent crowding or jamming of the draft animals when making a turn.

The object of the invention is to provide a rest or support including spaced depending shoes, the free ends of which are disposed above the surface of the ground when the harrow is in operation and adapted to rest on the ground and form a support for the double and swingletrees when the harrow is at rest.

A still further object of the invention is generally to improve this class of devices so as to increase their utility, durability, and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a top plan view of a disk harrow provided with a rest or support, constructed in accordance with my invention; Fig. 2 is a longitudinal sectional view of the same showing the position assumed by the rest or support when the harrow is in motion; Fig. 3 is a longitudinal sectional view of the forward portion of the stub tongue showing the position of the depending shoes when the harrow is at rest; Fig. 4 is a perspective view of the rest or support detached, the clamping plates being shown in perspective above the same.

Corresponding and like parts are referred to in the following description and indicated in all the views of the drawings by the same reference characters.

The improved rest or support forming the subject matter of the present invention is especially designed for attachment to a disk harrow, and by way of illustration is shown in connection with a harrow of the ordinary construction in which 5 designates the pivoted disk sections, 6 the connecting bar, and 7 the doubletree, to which are pivotally secured the swingletrees, indicated at 8.

Secured in any suitable manner to the connecting bar 6, is a stub tongue 9, the free end of which is projected longitudinally beyond the pivot 10 of the doubletree to form a support for the depending shoes 11 of the support or rest.

The support or rest is preferably formed of a single piece of metal having its lower end bifurcated to produce the shoes 11, and its upper portion provided with a threaded shank 12 which extends through the projecting end of the stub tongue 9 for engagement with a clamping bolt 13.

Secured to the upper and lower faces of the stub tongue 9 at the projecting end thereof, are oppositely disposed reinforcing plates 14 and 15 having their longitudinal edges bent downwardly to form depending flanges 16 for attachment to the adjacent longitudinal edges of the stub tongue, thereby to prevent spreading or chipping of the tongue at its point of attachment to the shoes.

The lower attaching plate 15 is provided with an angular enlargement 17 having a squared socket 18 formed therein and adapted to receive a correspondingly squared portion 19 on the shank 12 so as to prevent accidental turning movement of the depending shoes and thus maintain the latter in proper position with respect to the doubletree.

The free ends of the shoes 11 are curved laterally at 20 for engagement with the ground when the harrow is at rest so as to form a support for the stub tongue 9, doubletree 7 and swingletrees 8.

The shoes 11 are preferably disposed slightly in advance of the doubletree so as not to interfere with the movements of the latter, while the terminals of said shoes are normally supported above the surface of the ground so as to clear the same.

It will here be noted that the shoes 11 are spaced apart so as to prevent the latter from coming into contact with stalk stubs, and other surface obstructions, while the terminals of the shoes are curved rearwardly to prevent the shoes from catching on said stalk stubs as the harrow is drawn over the surface of a field. It will also be noted that by providing the harrow with a stub tongue instead of the usual draft tongue, the draft animals are effectually prevented from crowding or jamming each other when making turns, thus allowing free movement of the draft animals at all times.

While the rest or support is shown in connection with a harrow, it is obvious that the same may be used with equally good results for supporting the double or swingletrees of plows, land-rollers, and other vehicles without departing from the spirit of the invention.

Having thus described the invention, what is claimed as new is:

1. The combination with a vehicle having a tongue, plates secured to the opposite faces of the tongue, one of said plates being provided with an enlargement having an angular socket formed therein, a shank piercing both plates and provided with an angular enlargement arranged to enter said socket, and spaced shoes depending from the shank and normally supported in elevated position above the ground when the vehicle is in motion and adapted to bear against the ground to form a support for the tongue when the vehicle is at rest.

2. The combination with a vehicle having a tongue, plates secured to the opposite faces of the tongue and provided with longitudinal flanges adapted to bear against said tongue, one of the plates being provided with a depending enlargement having an angular socket formed therein, a threaded shank extending through both plates and having its lower end bifurcated to form depending shoes provided with rearwardly curved terminals, a squared portion on the shank fitting within the socket, and a clamping nut engaging the threaded end of the shank and bearing against the adjacent plate.

3. The combination with a vehicle having a tongue, a plate secured to the tongue and having an angular socket formed therein, a shank piercing the plate and provided with an angular enlargement arranged to enter said socket, the lower end of said shank being curved laterally to form a depending shoe normally supported in elevated position above the ground when the vehicle is in motion and adapted to bear against the ground to form a support for the tongue when the vehicle is at rest.

In testimony whereof I affix my signature in presence of two witnesses.

J. CLYDE ROATH. [L. S.]

Witnesses:
  F. A. STRICKLER,
  J. H. PETTIT.